2,859,119
Patented Nov. 4, 1958

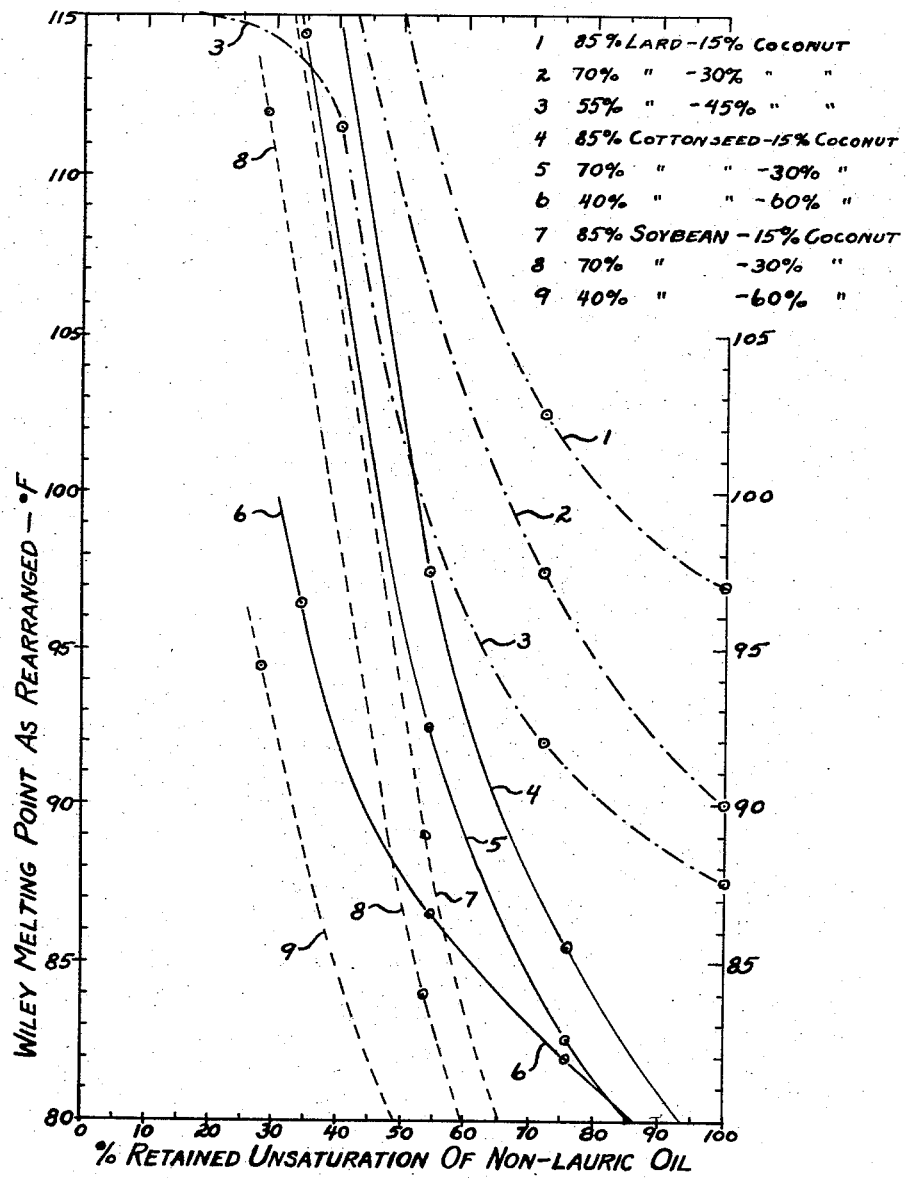

2,859,119

REARRANGED BASE STOCK TRIGLYCERIDE PRODUCTS AND PROCESS OF MAKING SAME

Walter M. Cochran, Highland Park, Melvin Leroy Ott, Chicago, and Claude W. Lantz, La Grange, Ill., assignors to The Glidden Company, Cleveland, Ohio, a corporation of Ohio Application May 25, 1953, Serial No. 356,962

6 Claims. (Cl. 99—118)

This invention relates to novel catalytic rearrangement processes, and to novel catalytically-rearranged fat products which have a Wiley melting point between about 85° F. and 110° F. which contain the fatty acid radicals of both lauric and nonlauric triglyceride oils and which are characterized by a higher content of the $C_6$–$C_{14}$ fatty acid radicals of lauric oils than originally existed in the non-lauric oils used in preparing each product. Such a product can be prepared, for instance, by rearranging a blend composed of at least one non-lauric oil mixed with at least one lauric oil.

The novel products of the invention are also characterized by being composed essentially of randomly-distributed combined fatty acids, such random distribution being the result of catalytic rearrangement of the starting materials by means of low-temperature rearrangement catalyst(s). The random distribution of the combined fatty acids and the increased content of $C_6$–$C_{14}$ fatty acid radicals together are instrumental in producing plastic fats which are eminently suited for use directly as shortening products or for use as basestock for preparing standard compound shortenings, shortening specialties, margarine oils, frying fats, and other edible fat products. Such fat products, unlike hard butters, do not have a sharp fracture quality (snap) and have a melting range which is wider than that of hard butters but narrower than that of a non-lauric oil.

The novel products of the invention are further characterized by exhibiting a variety of physical properties which are different from those of the unrearranged mixture of starting materials, such differences in physical properties being the direct result of rearrangement of the starting mixture. Some of the physical properties which are so altered by catalytic rearrangement are Wiley melting point, melting range, congeal point, plasticity, creaming properties, crystallization characteristics and eating characteristics.

For example, the starting mixture corresponds somewhat to a conventional compounded shortening; that is, it is a blend of hard and soft fats. Such a product has a broad melting range since there are many different triglycerides in the mixture which melt at different temperatures and which in all likelihood interact to give numerous eutectic systems. Our rearranged fat products, on the contrary, have a smaller number of different triglycerides, fewer eutectic systems, and are usually free of the highest and lowest melting pure triglycerides like tri-stearates, tri-caprylates, tri-caproates, etc. Consequently, our rearranged fat products tend to have a narrower melting range than that of the unrearranged starting mixture, but at the same time to have a wider melting range than is found in the brittle, hard-butter type fats.

From what has been said above, it will be recognized that the products of the invention have characteristics which fit them especially for use in the shortening art, and the following discussion of certain aspects of this art will assist in clarifying some of the aims and purposes of the invention.

Plastic shortenings are conventionally produced by appropriate thermal and mechanical treatment of a mixture of low-melting oil commonly called "basestock" and of high-melting fat commonly called "hardstock." The basestock is commonly unsaturated in character and predominantly liquid at ordinary temperatures, although it may and frequently does contain a proportion of saturated compounds. Vegetable seed oils, such for example as cottonseed oil and soybean oil, either unhydrogenated or partially hydrogenated, are especially suitable for such basestocks. The hardstock is commonly saturated in character and solid at ordinary temperatures, although it may and frequently does contain a proportion of unsaturated compounds. Extensively hydrogenated oils are examples of such hardstocks. Even in the case of lard, a small percentage of extensively hydrogenated fat is frequently added in order to obtain preferred consistency at high temperature. In other instances, lard has too high a melting point and too little plasticity to permit its extensive use in certain types of products. The present invention makes it possible to overcome this limitation on the usage of lard.

In producing plastic shortenings, the softening action of the liquid basestock and the stiffening action of the solid hardstock are balanced so as to obtain the desired plasticity. If, within the range of temperatures ordinarily encountered in handling shortenings, the basestock is truly liquid even at the lower temperatures and the hardstock remains solid even at the higher temperatures, a change in temperature within this range will not greatly affect plasticity of the shortening and it is said to have a wide plastic or working range. Such ideal shortenings are seldom encountered. In actual shortenings, hardness normally increases as temperature decreases, while on the other hand the material may become mushy at high temperature before complete melting takes place. Both such behaviors are undesirable.

Shortenings composed of mixtures of essentially saturated hardstock and of unhydrogenated vegetable oils may have a desirable degree of plasticity over a range of temperature, but yet contain readily oxidizable, highly unsaturated constituents and hence be subject to rancidity and deterioration on aging. To remedy this defect, the basestock may be partially hydrogenated. As a result, some saturated fats may inadvertently be formed, having a stiffening action on the mixture. In general, if the proportion of hardstock is too great, the shortening will be objectionably hard at lower temperatures, and will be plastic over only a limited temperature range. Keeping quality suffers, however, if the iodine value of the basestock is too high, and particularly if appreciable proportions of combined fatty acids having two or more double bonds are present.

The hardstocks which are used in practicing our invention are the high molecular, substantially saturated triglycerides used in making conventional shortenings. Vegetable oils such for example as cottonseed, soybean, peanut, rapeseed and corn oils and the like are well suited for such use when hydrogenated to sufficiently low iodine value, below 10 for example. The stearine fraction of grained oils, particularly if hydrogenated, may also in some cases be used for the purpose. The relative proportions of hardstock and basestock in the shortenings of our invention may vary widely as is the case with conventional shortenings, although the hardstock is always present in minor proportion (usually less than one-fifth by weight of the total) in accordance with the requirements for stiffening, while the basestock is always present in major proportion.

The present invention relates to processes for preparing improved "basestock" for use in shortenings, or for use directly as an edible fat.

Accordingly, it is an object of this invention to provide improved basestock for shortenings and like plastic fat products. It is a further object to provide rearranged basestock which contains one or more of the $C_6$—$C_{14}$ fatty acid radicals which are found in lauric oils in a higher content than ordinarily present in natural non-lauric oils. Another object is to provide a process by means of which a wider choice of available raw materials becomes possible for the preparation of plastic fats. Yet another object is to provide shortenings and like plastic fat products which have improved keeping qualities.

These and other objects will be apparent from the following description of the invention.

In the foregoing statements and in the remainder of this specification, the term "non-lauric oil" is intended to identify edible vegetable and/or animal fatty triglyceride mixtures whose fatty acid radicals contain between 12 and 24 carbon atoms and whose combined lauric acid content is less than about 42% by weight on the total weight of combined fatty acids contained in said triglyceride mixtures. Examples of natural vegetable "non-lauric oils" are soybean, cottonseed, peanut and palm oils. Examples of animal "non-lauric oils" are lard, beef-tallow and mutton-tallow. Mixtures of such animal and vegetable non-lauric oils are contemplated as are individual fractions of animal or vegetable non-lauric oils, and mixtures of such fractions with each other or with one or more non-lauric oils. The term "lauric oil" is intended to mean an oil of the coconut oil group, such as coconut, palm-kernel, babassu or murumuru oil, mixtures of such oils, individual fractions of oils of the coconut group, and mixtures of such fractions with each other or with one or more of such oils. Fractions of the oils can be those prepared in any manner as by "graining" coconut oil, by subjecting an oil or mixture of oils to fractional distillation, by combinations of these and other treatments.

From what has been stated above, it will be understood that the invention is concerned with the preparation of novel fat products by rearranging mixtures of non-lauric and lauric oils. By the term "rearranging" we mean the use of a catalyst to induce the redistribution of the fatty acid radicals of the starting mixture with respect to the glyceryl radicals present in the starting mixture. The term "interesterification" is regarded by us to be synonymous therewith, but for the sake of uniformity we will herein speak in terms of "rearrangement." We regard "rearrangement" and "interesterification" to exclude such mechanisms as lead solely to the mere isomerization of fatty acid radicals, such as the conversion of oleic acid radicals to iso-oleic acid radicals. While such mechanisms may occur during rearrangement, they are generally of minor significance in comparison with the effects caused by redistribution of unchanged radicals with respect to the original triglycerides.

The rearranged fats contemplated as end products of the invention are especially those which have a Wiley melting point between about 85° F. and 110° F., but are broadly those which are composed of rearranged triglycerides obtained from an unrearranged starting mixture composed of from about 1% to 60% by weight of lauric oil and 40% to about 99% of non-lauric oil. Either the lauric oil content or the non-lauric oil content of the starting mixture or both can have been hydrogenated to reduce the original unsaturation therein. The lauric oil content can have been hydrogenated completely, but a non-lauric oil such as lard generally would not be hydrogenated extensively or completely unless amounts of lauric oil approaching 60% by weight can be tolerated to yield the characteristics desired in the rearranged product. In some instances, it is necessary to hydrogenate either the lauric or non-lauric starting oils to some extent in order to keep the melting point of the rearranged fat product from falling below 85° F.; an alternative is to hydrogenate a rearranged product otherwise conforming to the invention until its Wiley melting point has been raised to at least 85° F. In general, however, we prefer to hydrogenate, if at all, prior to rearrangement and to then hydrogenate only the non-lauric component of the mixture which is to be rearranged. This procedure directs the hydrogenation more effectively to the reduction of such unsaturation in the non-lauric oil as would tend to induce flavor and/or oxidative deterioration of that component and of the rearranged fat product containing its fatty acid radicals. We also prefer to prepare rearranged fat products which (a) have the specified range of Wiley melting point and (b) have as little unsaturation as is consistent with the preparation of rearranged products having that melting point range. Where such preferred practice is followed, relatively large percentages of non-lauric oil can be used in preparing the products of the invention while yet securing products which have improved stability against oxidative and/or flavor deterioration. For example, soybean oil, which is well known to exhibit flavor reversion, can be hydrogenated sufficiently to be stable against reversion and other forms of deterioration, but then would usually be too hard for use in shortening. By mixing such a hydrogenated product in suitable amounts with lauric oil and rearranging the mixture, the end result is a plastic fat of excellent keeping qualities. While the blended unrearranged starting mixture just described would also have good keeping qualities, it would not correspond in plasticity, melting point, eating qualities, or crystallization characteristics with the rearranged product, and hence would not be a comparable basestock for shortening or numerous other edible fat products. Hence it will be apparent that the present invention makes it possible now to increase the usage of unstable reverting non-lauric oils in edible fat products while yet securing a fat product which usually represents an improvement over comparable conventional blended shortenings in respect to such qualities as plasticity, creaming, crystallization and eating characteristics.

Lard is another unsaturated non-lauric oil whose stability can be improved by hydrogenation but whose increased hardness resulting from hydrogenation can be moderated and fundamentally altered in character by the present invention, i. e., by rearranging a mixture composed of such hydrogenated lard and lauric oil, with or without other animal or vegetable non-lauric oil.

Lard is also a useful fat even without being hydrogenated to a more stable state. However, its use in certain products has heretofore been prevented because it is too hard and has too little plasticity by itself. By applying the present invention, that is, by rearranging the lard with lauric oil alone or with a mixture of lauric and non-lauric oil, new fat products can be prepared which are softer and more plastic than the untreated lard. Thus, the usage of lard in edible fat products can be expanded.

The following examples illustrate a few of the many possible embodiments of the invention.

EXAMPLE 1

Eighty parts of refined, bleached soybean oil (I. V. 132) was hydrogenated to a congeal point of 28.5° C. (I. V. 73.5) and a Wiley melting point of 95.5° F. and was then mixed with twenty parts of refined, bleached coconut oil. The resulting mixture had a congeal point of 26.4° C. and a Wiley melting point of 92.0° F. This mixture was rearranged by heating at 220° F. in glass under a nitrogen blanket, while being stirred continuously with 0.3% sodium methoxide. After one half hour of this treatment, the mass was washed three times with 10% water, then bleached and deodorized. The resulting fat had a congeal point of 25.2° C. and a Wiley melting point of 89.5° F.

Keeping quality as determined by the active oxygen method was 168 hours.

EXAMPLE 2

Eighty parts of natural, liquid lard which had been refined and bleached and which had a congeal point of 27.8° C. (I. V. 65.7) and a Wiley melting point of 101.0° F., was mixed with twenty parts of refined, bleached coconut oil. The resulting mixture had a congeal point of 24.8° C., a Wiley melting point of 98.5° F. and gave a waxy flavor or sensation in the mouth. This mixture was rearranged with 0.3% sodium methoxide at 210–220° F. for 15 minutes. The final deodorized product was stabilized with 0.002% propyl gallate, 0.01% butylated hydroxy anisole and 0.005% citric acid. This product had a congeal point of 24.5° C., a Wiley melting point of 95.7° F. and displayed a keeping quality of about 45 hours as determined by the active oxygen method.

The lard used in this example with or without added stearine cannot be plasticized to a satisfactory shortening product. The rearranged fat on the contrary can be blended with a small amount of stearine and can then be plasticized into a highly satisfactory shortening possessing excellent creaming and baking properties. It has good plasticity over a broad temperature range, while liquid (natural) lard tends to separate into its various components as it is heated.

EXAMPLE 3

Seventy parts of refined bleached lard, with a congeal point of 27.8° C. (I. V. 65.7) was hydrogenated to a congeal point of 34.5° C. (I. V. 56.2) and was blended with thirty parts of refined, bleached coconut oil. The resulting mixture had a congeal point of 29.2° C. and a Wiley melting point of 106.0° F. This blend was rearranged with 0.4% sodium methoxide at 210–220° F. for 10 minutes. The final deodorized product was stabilized with 0.002% propyl gallate, 0.01% butylated hydroxy anisole and 0.005% citric acid. This product had a congeal point of 27.4° C., a Wiley melting point of 97.0° F. and displayed a keeping quality of over 158 hours as determined by the active oxygen method. Moreover, it melted within the mouth and had none of the waxiness observed in the unrearranged blend.

EXAMPLE 4

Seventy parts of refined, bleached soybean oil (I. V. 132) was hydrogenated to a congeal point of 34.0° C. (I. V. 67.0) and was mixed with thirty parts of refined, bleached coconut oil. The resulting mixture had a congeal point of 30.2° C. and a Wiley melting point of 103.0° F. The mixture was heated at 225° F.–235° F. in a stainless steel deodorizer unit under a vacuum of 0.1" to 0.2" absolute pressure. Nitrogen at 10 pound pressure was bubbled through the charge for agitation purposes for a period of five minutes. Mechanical agitation can also be used with or without nitrogen agitation. Sodium methylate in an amount of 0.10% by weight of the mixed oils was prepared as a slurry in about 10 parts of the oil of the charge, and the slurry was drawn into the batch after which nitrogen pressure was increased to 50 pounds to provide vigorous stirring. The reaction was continued for about 7 minutes, after which time it was judged from the reddish-brown color that the reaction had been completed. The nitrogen pressure was then decreased to 10 pounds and the oil was cooled to about 190° F. The oil was then transferred to a neutralizing tank where about 10% of water was added to the oil. The water was added with rapid agitation over a period of 15 minutes. The agitation was then stopped and the batch was allowed to settle for 30 minutes. A water spray amounting to 3% by weight of the oil was then given to the batch and settling was continued for an additional three hours. At the end of the settling period the water was drawn off the bottom of the kettle and the batch again washed with a water spray and again settled in the same manner. Then the oil was vacuum dried, bleached and deodorized. The resulting product had a congeal point of 27.5° C. and a Wiley melting point of 93.9° F. and displayed exceptional stability against flavor reversion. Keeping quality as determined by the active oxygen method was 480 hours. It will be noted that rearrangement lowered the congeal point and Wiley melting point in comparison with the unrearranged blend.

On continuous heating, the foregoing rearranged product polymerized in the container to a lesser extent than do the usual 28° C.–31° C. domestic fat shortenings. Hence it had improved qualities adapting it for frying.

A fat product such as that prepared in the manner described in Example 4 can be used to good advantage in the manufacture of frozen desserts analogous to ice cream. (Ice cream is a term which can be applied under present Federal regulations only to an all-dairy product. Where non-dairy fat, for instance, is used in the product (e. g., the vegetable fat of Example 4), regulations require the product to be called a "frozen dessert.") Frozen desserts have a very critical flavor specification, which heretofore would not be met when a normally-reverting oil was used in their preparation. Fats prepared in accordance with the present invention and having a Wiley melting point between about 88° F. and 97° F. can be used freely in the preparation of frozen desserts, even when prepared from normally-reverting animal and/or vegetable fats.

It should be recognized that not all fats have the physical properties which make them suitable for use in frozen desserts. Some produce coarse, short-grained or brittle products, others exhibit poor melt-down characteristics. The most common objection to vegetable fats is that they produce a sensation of oiliness to the palate, and leave a fatty film in the mouth. For instance, 76° coconut oil, partially hydrogenated coconut oil, or hydrogenated non-lauric oil having a melting point of 88° F.–97° F. have been used in frozen desserts. The straight coconut oil and partially hydrogenated coconut oils usually do not give adequate smoothness in the resulting frozen dessert, while the hydrogenated non-lauric oils give an oily taste. In contrast, rearranged fats prepared in accordance with the invention and which have a Wiley melting point between about 88° and 97° F. are bland and yield frozen desserts which leave no oily taste and which are smoother in texture and generally more palatable. A fat product such as that prepared in Example 4 is very satisfactory since such fat has a melting point approximately the same as milk fat; namely, 88°–90° F. This is important because it means that the fat melts at body temperature and will not leave a fatty film in the mouth. At the same time the fat does not have a sharp crystallization point, which would cause the frozen dessert to have a short-grained body and texture. Moreover, the fat can be blended readily with the other ingredients of the frozen dessert, by the use of normal agitation, by the time the pasteurizing temperature is reached. The following formulas exemplify the use of such a rearranged fat product in frozen desserts having various fat contents:

|  |  |  |  |
|---|---|---|---|
| Fat product of Example 4 | 3.00 | 6.00 | 12.00 |
| Milk solids (non fat) | 13.50 | 12.00 | 10.50 |
| Cane or beet sugar | 12.00 | 12.00 | 12.50 |
| Corn syrup solids | 5.00 | 4.50 | 4.00 |
| Stabilizer, emulsifier-protein base | 2.00 | 2.00 |  |
| Combination stabilizer and emulsifier |  |  | 0.40 |
| Total Solids | 35.50 | 36.50 | 39.40 |

*Example (100-lb. Mixes)*

|  | Lbs. | Lbs. | Lbs. |
|---|---|---|---|
| Fat product of Example 4 | 3.00 | 6.00 | 12.00 |
| Cane or beet sugar | 12.00 | 12.00 | 12.50 |
| Corn syrup solids | 5.00 | 4.50 | 4.00 |
| Stabilizer, emulsifier-protein base | 2.00 | 2.00 |  |
| Combination stabilizer and emulsifier |  |  | .40 |

AND

|  |  |  |  |
|---|---|---|---|
| Skim milk powder | 14.00 | 12.50 | 11.00 |
| Water | 64.00 | 63.00 | 60.10 |

OR

|  |  |  |  |
|---|---|---|---|
| Skim milk | 70.50 | 69.50 | 66.30 |
| Non-fat dry milk powder | 7.50 | 6.00 | 4.80 |

OR

|  |  |  |  |
|---|---|---|---|
| 30% Condensed skim milk | 45.00 | 40.00 | 35.00 |
| Water | 33.00 | 35.50 | 36.10 |
| Total Weight | 100.00 | 100.00 | 100.00 |

The fat products of the invention can be used to excellent advantage for frying, ice-cream bar coatings, cracker spraying, sandwich fillings, filled milks, for candies and confections, vegetable fat whipped toppings, shortening, etc. In all such products and many others, flavor is an important factor. The present invention makes it possible now to use non-lauric oils in the preparation of fat products which will meet the flavor and other requirements of the above-mentioned food products.

Ice cream coating fats

Ice cream coating fats designed for use in sweet chocolate and vegetable fat (other than cocoa fat) coatings or in similar coatings must be set rapidly, should not be brittle, yet must melt sharply and cleanly in the mouth. Straight lauric fats usually set rapidly enough, but are much too brittle. Straight non-lauric fats are not particularly brittle, but are slow to set and eat poorly. Blends of the two also take too long to set and do not eat satisfactorily. The rearranged fats of the invention, however, are not brittle, and melt sharply and cleanly in the mouth, as shown by Example 5.

EXAMPLE 5

An ice cream bar coating fat was prepared from 60 parts of hydrogenated soybean oil having an iodine value of 68.1 and a congeal point of 33.3° C., and 40 parts of 76° F. coconut oil. The mixture was rearranged with .2% sodium methoxide while continuously maintained in homogeneous liquid phase at 200–210° F. The rearranged fat, after washing, bleaching and deodorization had a congeal point of 25.7° C., a Wiley melting point of 88.5° F., and an A. O. M. stability in excess of 350 hours. This fat was tested against coconut oil and a 50–50 blend of 97° F. Wiley melting point hydrogenated cottonseed oil and 76° F. coconut oil in a sweet chocolate and vegetable fat (other than cocoa fat) coating with the following results:

|  | Set Time, seconds | Drip Time, minutes | Coverage,[1] ounces | Eating Charact. |
|---|---|---|---|---|
| Coconut oil | 12 | 8 | .35 | Good. |
| Rearranged fat (above) | 14 | 7 | .40 | Good. |
| 50–50 Blend (above) | 19 | 9 | .36 | Good. |

[1] On 1 oz. ice-cream bar.

The test shows that the rearranged fat gave a coating having a satisfactory set time and a short drip time, without giving an excessively heavy coating on the ice cream.

Cream fillers for cookies

Shortenings designed for making fillings are usually a plasticized, complex mixture of unhydrogenated coconut oil, hydrogenated coconut oil, hydrogenated domestic oil and stearine. Fats for this purpose must possess certain unique properties. They must set with a bit of fracture when plasticized, but still must break down easily and cream well in an ordinary mixer when sugar is added. Moreover, the fat must cream with the sugar to give a filling of low density. When the filler is placed between cookies, it must reset so that it will not separate.

A fat prepared in accordance with this invention can be mixed with 4% stearine and then plasticized directly into a shortening for sandwich fillings which possesses all of the above characteristics. Though this simply formulated shortening will contain two to three times more non-lauric oil than is normally used, it will produce a filler of lower density than will the complex mixture mentioned above.

EXAMPLE 6

A sandwich filler fat was prepared from 60% hydrogenated cottonseed oil (31.2° congeal, I. V. 64.0) and 40% of 76° F. coconut oil, by rearranging the blend with .2% sodium methoxide while continuously maintaining the fats in homogeneous liquid phase at 200–220° F. The rearranged fat, after washing, bleaching and deodorizing, had a good flavor, a congeal point of 25.5° C., a Wiley melting point of 86.5° F., and an A. O. M. stability in excess of 200 hours. The fat was subsequently blended with 4% soybean stearine and was plasticized to give a sandwich filler shortening. A sandwich filler prepared from this shortening and sugar creamed to a specific gravity of 0.649, and was satisfactory in all eating and quality characteristics. A comparable product made in accordance with the usual complex formula seldom creams to a specific gravity lighter than 0.700.

Frying

Liquid and hydrogenated non-lauric oils and coconut oils are used for frying. Unhydrogenated non-lauric oils possess poor stability and cannot be used for all purposes. To produce a frying shortening of sufficient stability from non-lauric oil, the oil must be hardened to a 29° C. or 30° C. congeal point. When oils such as soybean or cottonseed are hydrogenated to this point, it is difficult to plasticize them in such a manner that the shortening product will be soft enough to remove from the drum easily.

76° F. coconut or hydrogenated coconut oils have extremely fine keeping properties and impart a good flavor to foods fried in them. They also can be filled into containers in such a way that the fat is easily removed, but coconut oil is a notorious foamer. Coconut oil is especially incompatible with oils from nutmeats and for this reason cannot be used with any great success for nut roasting purposes.

Here again, the rearranged fats of this invention possess all the good characteristics of each of the above two types, but none of the poor characteristics. A fat of the invention having a melting point of 90° F., for instance, will have a stability equal to coconut oil, can be plasticized to possess a soft consistency and will resist foaming, regardless of the types of foods fried in it. It also brings out the flavor of fried foods in the manner of coconut oil.

EXAMPLE 7

A frying oil was prepared from 70 parts hydrogenated soybean oil (congeal 32.2° C., I. V. 69.0) and 30 parts of 76° coconut oil, by rearranging the mixture with .2% sodium methoxide while continuously maintaining the oil in homogeneous liquid phase at 220° F. After washing, bleaching, deodorization, etc., the rearranged fat had a congeal of 27.0° C., a Wiley melting point of 91.0° F. and had good flavor. This fat was plasticized with 4% stearine into a shortening. The shortening was plastic and workable at 76° F., and soft enough to be easily removed from the drum in the usual manners. It was used to fry French-fried potatoes, breaded shrimp, potato chips and cashew nuts. The frying properties were those customarily demanded by the trade; namely, no foaming, no off-odors, and no smoking. Moreover, the tendency for this fat to polymerize (as evidenced by darkening of the oil, discoloration and carbonization) was less than that of conventional 27°–29° C. congeal shortening prepared from all non-lauric oil. The fried foods possessed very good flavor, and had no greasy or oily taste. The amount of fat absorbed by the foods was not excessive. When the unrearranged blend was used for frying the same foods, it foamed excessively.

From the foregoing description of the invention, it will be apparent that the stable rearranged fats of the invention, possess qualities and characteristics which cannot be secured simply by blending similar fats together, and that those qualities and characteristics render the rearranged fats eminently suited for use in preparing a wide variety of food products such as those mentioned hereinabove as well as cracker spraying oils, caramel lubricants, whipped toppings, pop-corn popping oil, and many others.

No extended discussion of hydrogenation technique is deemed necessary to explain the present invention since those skilled in the art are well versed in the ramifications of that art as engendered by the use of variations in pressure, temperature, time, catalyst(s), etc. To the best of our knowledge, it is fully within the ability of one skilled in the art to select conditions and perform suitable hydrogenation of non-lauric oils (and/or lauric oils, if desired) so as at least to eliminate most of the conjugated unsaturation therein such as that found in the linoleic, linolenic and other unsaturated acid radicals of common unsaturated oils and fats.[1] This usually coincides with an iodine value on soybean oil around 100–110. Additional hydrogenation beyond this point permits further improvement in stability, and adjustment of the melting point of the rearranged fat product. The original unsaturation of non-lauric oils should preferably be reduced at least one-third for some purposes of this invention. It should be understood, of course, that only partial hydrogenation of non-lauric oils is contemplated for the most part in the present invention, although complete hydrogenation of the non-lauric fat(s) can be useful under certain circumstances. As much as 40% non-lauric stearine (I. V.=0) can be used with 60% coconut or other lauric oil without producing rearranged products of excessive waxiness. The hydrogenation of non-lauric oils until the oleic acid content has at least reached its maximum value gives non-lauric components which are well suited for use in preparing our stable, rearranged fats.

Rearrangement of glycerides by means of catalysts is of course well known to those skilled in the art, and the treatment is generally understood to involve exposing the desired reaction mixture to a small amount of effective catalyst(s) under favorable reaction conditions at temperatures up to about 250° F. The catalyst should be a low-temperature rearrangement catalyst such as an alkali metal alkoxide having up to 4 carbon atoms, an alkali metal hydride such as sodium hydride, or one or more of various other catalysts such as are described in the Eckey U. S. Patent No. 2,442,536. Similar alkaline compounds such as lithium aluminum hydride and calcium hydride have been found by us to be ineffective, as have such known catalytic materials as aluminum isopropylate. We are aware of the Gooding U. S. Patent No. 2,309,949 in which a variety of alkaline-reacting compounds are employed in a combination with hydroxyl-carrying materials, but such catalysts and/or the high reaction temperatures involved in their use are here avoided.

Small amounts of one or more of the low temperature rearrangement catalysts are employed in the treatment, as little as .02% of sodium methoxide by weight on the mixture of glycerides being effective when conditions are such that the methoxide is in an active condition. Most of the effective catalysts induce an exothermic reaction, and such exothermicity becomes increasingly difficult to work with as the amount of catalyst is increased. Moreover, losses of glycerides tend to be increased and more saponification tends to occur. For these reasons we

[1] See "Rancidity in Edible Fats," by C. H. Lea; Chemical Publishing Company, 1939, pages 184–188; also U. S. Patents 2,627,467, -468 and -469.

avoid the use of more than about 1% of catalyst. We prefer to use between about 0.1% and 0.5% of such active catalysts as sodium methoxide, sodium ethoxide or sodium hydride, and prefer a formula-equivalent percentage of other active low-temperature catalysts.

The catalyst is easily destroyed or inactivated by water, moisture, carbon dioxide and air. Accordingly, in order to provide treating conditions which are favorable to activity on the part of the catalyst, the mixture of triglycerides should be thoroughly dry, and contact with the moisture and carbon dioxide of the air must be effectively prevented. We have found that an inert atmosphere such as hydrogen, nitrogen or vacuum is very effective. When an inert gaseous atmosphere of dry hydrogen or nitrogen is maintained over the mixture of glycerides, the treatment can be effectively carried out in a loosely-covered container. Preferably, however, the treatment is conducted in a vacuum chamber since by heating the mass to expeditious reaction temperatures in a vacuum of around 0.1 to 0.2 inch of mercury or lower, the glycerides can be dried effectively. Nitrogen can then be introduced for agitation and blanketing purposes to reduce the vacuum to about 1.5 inches' gauge pressure. Mechanical agitation can also be used, of course. The container may be of iron, stainless steel or glass, but other unreactive materials can also be used.

The catalyst is also destroyed by free acids and by peroxides. Accordingly, the glycerides which are to be treated should have been refined in advance with alkalis or otherwise to reduce the free fatty acid content to about .05% or lower, and to eliminate peroxides as far as possible. It should be understood that the provision of refined triglycerides and of other conditions favorable to the catalyst is done mainly in the interest of economizing the catalyst and to lower refining losses in the finished material. The consequence of not making such provisions is simply that the quantity of catalyst which must be introduced to overcome all such unfavorable factors is wasted.

As indicated above, the temperature of the catalytic treatment can be varied over an appreciable range. When solvents are employed, temperatures as low as room temperature have been employed successfully. When the treatment is conducted in the presence or absence of solvents, the temperature should at least be high enough to maintain the mass in homogeneous liquid phase throughout the catalytic treatment. In the absence of solvents, the minimum temperature will, of course, depend on the particular mixture of triglycerides which is being treated. Temperatures as high as 250° F. have been used successfully in vacuum equipment in the absence of solvents, but we prefer to use temperatures around 200°–240° F. in such vacuum equipment as they lead to low losses of material and to the formation of but little soap. Temperatures above about 250° F. are avoided because of catalyst decomposition and because of the exothermicity of the reaction and the disadvantageous results attendant thereon, as mentioned above.

The effectiveness of the catalyst and of the treatment can be determined by the changed physical properties of the mass, but we have also found that it is easily determined by the color of the mass of glycerides. The color of the mass changes from its original color to a reddish-brown color when the rearrangement reactions have been completed. If no such color change is observed within a few minutes after the catalyst has been added, it signifies that something has deactivated the catalyst. Frequently the initial addition of the catalyst almost cures the difficulty, and the rearrangement and color change will be found to occur promptly on the further addition of a small quantity of catalyst. Likewise, when only a slight color change is observed, it may signify that the catalyst was initially active but was soon inactivated. A further addition of catalyst will then cause the reaction to go to completion. We have observed that the rearrangement reaction goes to completion in the space of a few minutes if sufficient active catalyst is present. The addition of more catalyst under such conditions produces no further change, nor does holding the mass for a prolonged period of time.

After the catalytically-induced rearrangement reaction has been completed, the mass (if hot) can be cooled sufficiently to permit it to be washed with water or dilute acids so as to decompose the catalyst. Such washing is preferably done at temperatures around 170–180° F. since there is little tendency at such temperatures for an emulsion to be formed. The washed material can then be stratified and the water separated from the mass of treated oil. The oil can then be dried by applying vacuum with or without further heating. The drying operation can, of course, be done in any of the other ways well known to those skilled in the art.

After the mass of glycerides has been treated to effect rearrangement, and then has been washed, it is next bleached and then deodorized. The bleaching and deodorizing treatments can be any of the conventional ones, and need no extended description here.

The general principles of the invention have now been explained and exemplified. The following discussion serves to summarize those principles and to provide a fuller understanding of them. Reference is now made to the attached figure of drawings which shows the relationship between (a) the percentage of retained unsaturation in the non-lauric oil component of the mixture which is to be rearranged, (b) the percentage of lauric oil present in said mixture, and (c) the Wiley melting point of the rearranged mixture. Retained unsaturation can be calculated in percentage from the formula:

$$\text{Percent R. U.} = 100 \left( \frac{\text{I. V. A. H.}}{\text{I. V. O.}} \right)$$

wherein

R. U. = retained unsaturation
I. V. O. = original iodine value
I. V. A. H. = iodine value after hydrogenation While the drawings show these relationships for only a few of the numerous mixtures of oils which are possible of use, it will be clear that they typify the relationships which prevail between any non-lauric oil component (at any desired percentage of retained unsaturation) and any lauric oil component. A family of curves can be drawn to represent the exact relationships as influenced by the retained unsaturation in any single non-lauric oil, in any constant mixture of non-lauric oils, in any single non-lauric oil fraction, in any constant mixture of non-lauric fractions and in any constant mixture of one or more non-lauric fractions with one or more no-lauric oils. Likewise, a family of curves can be drawn for any of the above non-lauric components with any desired percentage of a constant lauric component, whether that be a single lauric oil, a lauric oil fraction, a mixture of lauric oils, a mixture of lauric oil fractions, a mixture of one or more lauric oils with one or more lauric oil fractions, or any of the foregoing lauric components unhydrogenated, partially hydrogenated or completely hydrogenated. By determining the family of curves which pertain to the precise mixtures of components which one intends to use, it is thereafter a simple matter to consult the curves and from them to determine what proportions of non-lauric and lauric components and what percentage of retained unsaturation in a starting mixture will yield a rearranged product of the desired melting point. Then appropriate blends can be chosen so as to give other qualities which may be desired while yet producing approximately the desired melting point. Even without the curves as a guide, those skilled in the art will recognize that once a person has selected the particular lauric and non-lauric components which he desires to use, it is only necessary to run one or two trial samples to determine the proportions of lauric to non-lauric, and the percentage of retained unsaturation which will best approximate the physical properties and other qualities which he desires.

The following tables provide further examples of the invention, these examples including many on which the curves of the single figure of drawings are based. In these examples, all were run in the same manner after the non-lauric oils had been hydrogenated various amounts. The rearrangements and subsequent washing, bleaching, and deodorizing were performed in the manner described in Example 4.

TABLE 1

| Starting Mixture | | | | | | | Rearranged Mixture | | |
|---|---|---|---|---|---|---|---|---|---|
| Cottonseed | | | | | Coconut | | Wiley M.P., °F. | Congeal, °C. | AOM, Hrs. |
| Amt., percent | Congeal, °C. | IVO[1] | IVAH[1] | Percent RU[1] | Amt., percent | Percent RU[1] | | | |
| 70 | 33.8 | 109 | 59.0 | 54.0 | 30 | 100 | 93.2 | 28.4 | 335 |
| 60 | 31.3 | 109 | 63.5 | 58.5 | 40 | 100 | 87.5 | 26.5 | ------ |
| 60 | 31.7 | 109 | 62.5 | 57.5 | 40 | 100 | 88.0 | 26.3 | ------ |
| 60 | 32.4 | 109 | 62.0 | 57.0 | 40 | 100 | 89.0 | 27.2 | 180 |
| 60 | 39.2 | 109 | 52.0 | 47.7 | 40 | 100 | 95.4 | 30.6 | 100+ |
| Soybean | | | | | | | | | |
| 70 | 34.0 | 130 | 67.0 | 51.5 | 30 | 100 | 93.0 | 27.5 | 480 |
| 70 | 32.9 | 126 | 69.5 | 55.0 | 30 | 100 | 89.5 | 27.0 | ------ |
| 60 | 34.2 | 127 | 66.5 | 52.5 | 40 | 100 | 89.5 | 27.7 | 400+ |
| 60 | 34.0 | 130 | 67.0 | 51.5 | 40 | 100 | 91.0 | 26.7 | ------ |
| 60 | 33.3 | 126 | 68.0 | 54.0 | 40 | 100 | 88.5 | 25.7 | ------ |
| 60 | 39.5 | 128 | 61.0 | 47.5 | 40 | 100 | 95.0 | 28.9 | 400+ |
| Lard | | | | | | | | | |
| 60 | 38.1 | ------ | ------ | ------ | 40 | 100 | 95.2 | 29.5 | 350+ |
| Cottonseed-Soybean Mixture[2] | | | | | | | | | |
| 50 | 26.5 | ------ | 71.0 | ------ | 50 | 100 | 85.5 | ------ | ------ |

[1] Same as the corresponding abbreviations identified previously.
[2] 60% cottonseed–40% soybean.

TABLE 2.—COTTONSEED SERIES

[Liquid cottonseed oil. (108.2 I. V.) R. U.=100%.]

| | W. M. P.,° F. |
|---|---|
| 99 C/S[1]+1 C/N[2] | 79.5 |
| 85 C/S+15 C/N | 78.5 |
| 70 C/S+30 C/N | 78.0 |
| 55 C/S+45 C/N | 77.0 |
| 40 C/S+60 S/N | 77.5 |

[1] Cottonseed oil.
[2] Coconut oil.

HYDROGENATED COTTONSEED OIL
[(82.1 I. V.) R. I. 46.8. R. U.=76%.]

| | W. M. P.,° F. |
|---|---|
| 99 C/S+1 C/N | 89.0 |
| 85 C/S+15 C/N | 85.5 |
| 70 C/S+30 C/N | 82.5 |
| 55 C/S+45 C/N | 81.0 |
| 40 C/S+60 C/N | 82.0 |

HYDROGENATED COTTONSEED OIL
[(58.9 I. V.) R. I. 44.2. R. U.=54.5%.]

| | W. M. P.,° F. |
|---|---|
| 99 C/S+1 C/N | 101.0 |
| 85 C/S+15 C/N | 97.5 |
| 70 C/S+30 C/N | 92.5 |
| 55 C/S+45 C/N | 88.5 |
| 40 C/S+60 C/N | 86.5 |

HYDROGENATED COTTONSEED OIL
[(37.5 I. V.) R. I. 40.6. R. U.=34.6%.]

| | W. M. P.,° F. |
|---|---|
| 99 C/S+1 C/N | 129.5 |
| 85 C/S+15 C/N | 122.0 |
| 70 C/S+30 C/N | 114.5 |
| 55 C/S+45 C/N | 104.5 |
| 40 C/S+60 C/N | 96.5 |

TABLE 3.—SOYBEAN SERIES
[Liquid soybean. (I. V. 132.5) R. U.=100%.]

| | W.M.P., °F. | C.P., °C. |
|---|---|---|
| 99 S/B[1]+1 C/N[2] | | |
| 85 S/B+15 C/N | | |
| 70 S/B+30 C/N | 65.5 | |
| 55 S/B+45 C/N | 68.0 | |
| 40 S/B+60 C/N | 71.5 | |

[1] Soybean oil.
[2] Coconut oil.

HYDROGENATED SOYBEAN OIL
[97.0 I. V.) R. I. 50.1. R. U.=73%.]

| | W.M.P., °F. | C.P., °C. |
|---|---|---|
| 99 S/B+1 C/N | 73.5 | |
| 85 S/B+15 C/N | 74.5 | 16.5 |
| 70 S/B+30 C/N | 71.5 | 17.7 |
| 55 S/B+45 C/N | 72.0 | 19.2 |
| 40 S/B+60 C/N | 73.0 | 20.3 |

HYDROGENATED SOYBEAN OIL
[(72.0 I. V.) R. I. 45.4. R. U.=53.5%.]

| | W.M.P., °F. | C.P., °C. |
|---|---|---|
| 99 S/B+1 C/N | 94.0 | 26.8 |
| 85 S/B+15 C/N | 89.0 | 24.5 |
| 70 S/B+30 C/N | 84.0 | 23.0 |
| 55 S/B+45 C/N | 79.5 | 22.1 |
| 40 S/B+60 C/N | 78.0 | 22.4 |

HYDROGENATED SOYBEAN OIL
[(37.9 I. V.) R. I. 41.0. R. U.=28.4%.]

| | W.M.P., °F. | C.P., °C. |
|---|---|---|
| 99 S/B+1 C/N | 127.5 | 49.2 |
| 85 S/B+15 C/N | 120.0 | 44.3 |
| 70 S/B+30 C/N | 112.0 | 38.9 |
| 55 S/B+45 C/N | 104.0 | 32.1 |
| 40 S/B+60 C/N | 94.5 | 30.6 |

TABLE 4.—LARD SERIES
[Liquid lard. (66.0 I. V.) R. I. 45.3. R. U.=100%.]

| | W. M. P.,° F. |
|---|---|
| 99 lard+1 C/N[1] | 102.5 |
| 85 lard+15 C/N | 97.0 |
| 70 lard+30 C/N | 90.0 |
| 55 lard+45 C/N | 87.5 |
| 40 lard+60 C/N | 86.0 |

HYDROGENATED LARD
[(47.8 I. V.) R. I. 43.0. R. U.=72.3%.]

| | W. M. P.,° F. |
|---|---|
| 99 lard+1 C/N | 108.0 |
| 85 lard+15 C/N | 102.5 |
| 70 lard+30 C/N | 97.5 |
| 55 lard+45 C/N | 92.0 |
| 40 lard+60 C/N | 86.0 |

HYDROGENATED LARD
[(26.5 I. V.) R. I. 39.6. R. U.=40.4%.]

| | W. M. P.,° F. |
|---|---|
| 99 lard+1 C/N | 134.0 |
| 85 lard+15 C/N | 124.5 |
| 70 lard+30 C/N | 117.0 |
| 55 lard+45 C/N | 111.5 |
| 40 lard+60 C/N | 99.5 |

HYDROGENATED LARD
[(3.97 I. V.) R. I. 37.0. R. U.=6%.]

| | W. M. P.,° F. |
|---|---|
| 99 lard+1 C/N | ---- |
| 85 lard+15 C/N | ---- |
| 70 lard+30 C/N | ---- |
| 55 lard+45 C/N | 115.5 |
| 40 lard+60 C/N | 105.0 |

[1] Coconut oil.

From the foregoing discussions, examples and description of the invention, it will be apparent that the invention provides a simple, rapid, low temperature process permitting one to utilize non-lauric oils in larger amounts in plastic fat products than has generally been possible in the past, and that the resulting rearranged fat products exhibit combinations of physical properties which are highly useful in edible food products but which could not heretofore be obtained simply by mixing lauric and non-lauric oils together. These broad advantages, as well as the more specific ones described previously, are the direct result of applying the principles set forth hereinabove and claimed below. Those skilled in the art will recognize that those principles may be applied in a variety of ways, only a few of which have been exemplified herein specifically. Applications of the principles in manners encompassed by the following claims are contemplated as part of this invention.

Having described our invention what we claim is:

1. In a process for preparing a randomly-rearranged triglyceride base stock having a Wiley melting point between about 85° F. and 110° F. wherein a non-lauric oil component in amounts corresponding to about 60–90% by weight is blended with a lauric oil component as the remainder, and the resulting blend is catalytically rearranged while continuously maintained in homogeneous liquid phase, the improvement which comprises the steps of: prior to rearrangement, bringing the unsaturation value of the non-lauric component into the iodine value range of about 37.5 to 82 units and concomitantly in view of the selected iodine value adjusting the proportions between the lauric and non-lauric components of the blend to be treated so that the rearranged blend will have a melting point in the range designated above, thereby to utilize controlled unsaturation in securing melting characteristics in the rearranged product intermediate between those of non-lauric oils and those of conventional hard butters.

2. The improvement claimed in claim 1 wherein the non-lauric oil component is composed essentially of cottonseed oil which has been hydrogenated to an iodine value between about 37.5 and 82.

3. The improvement as claimed in claim 2 wherein the lauric oil component amounts to between about 30% and 40% by weight.

4. The improvement claimed in claim 1 wherein the non-lauric oil is composed essentially of soybean oil which has been hydrogenated to an iodine value between about 38 and 73.5.

5. The improvement as claimed in claim 4 wherein the lauric oil component amounts to between about 15% and 40% by weight.

6. The randomly-rearranged base stock prepared by the process defined in claim 1.

References Cited in the file of this patent

UNITED STATES PATENTS

| | | |
|---|---|---|
| 1,372,615 | Ellis | Mar. 22, 1921 |
| 1,968,732 | Anagnos | July 31, 1934 |
| 2,048,364 | Willems | July 21, 1936 |
| 2,309,949 | Gooding | Feb. 2, 1943 |
| 2,378,005 | Eckey | June 12, 1945 |
| 2,442,532 | Eckey | June 1, 1948 |
| 2,442,535 | Eckey | June 1, 1948 |
| 2,442,536 | Eckey | June 1, 1948 |
| 2,442,537 | Eckey | June 1, 1948 |
| 2,558,547 | Eckey | June 26, 1951 |
| 2,726,158 | Cochran et al. | Dec. 6, 1955 |

OTHER REFERENCES

Bailey: Industrial Oil and Fat Products, 2nd edition, 1951, pp. 49–52, 250–253.

Bailey: Industrial Oil and Fat Products, 2nd edition, 1951, pp. 827, 828.